Nov. 26, 1968  G. McCLURE ETAL  3,413,426
DIRECTION SIGNALING APPARATUS
Filed June 17, 1966  2 Sheets-Sheet 1
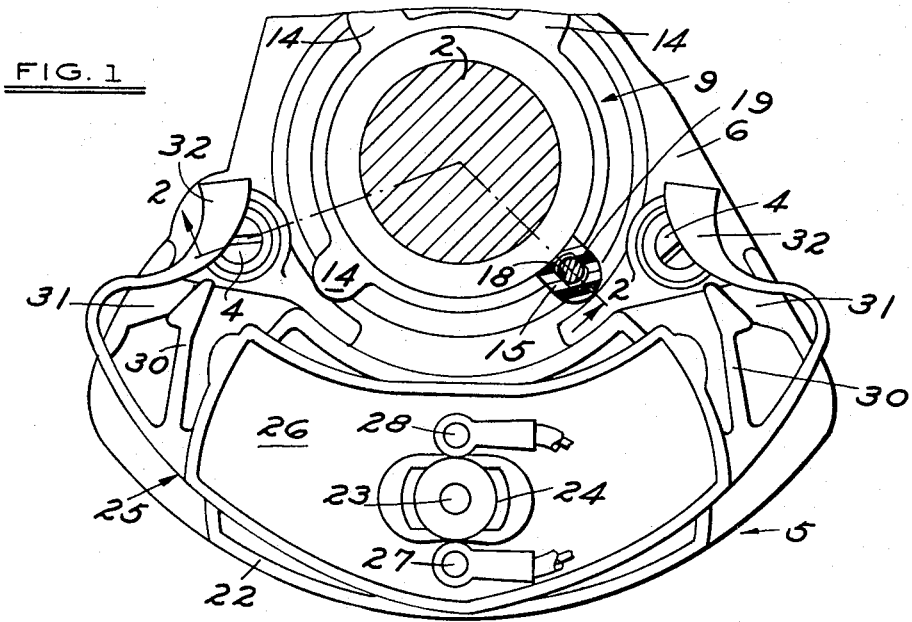
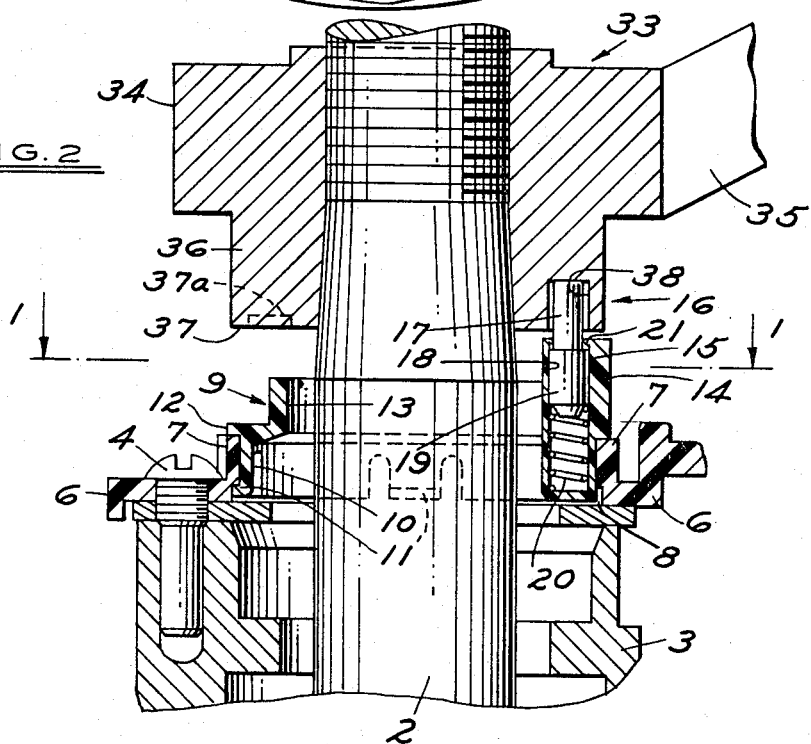
INVENTORS
Ray F. Winogrocki
Gerald McClure
BY
Learman & McCulloch
ATTORNEYS

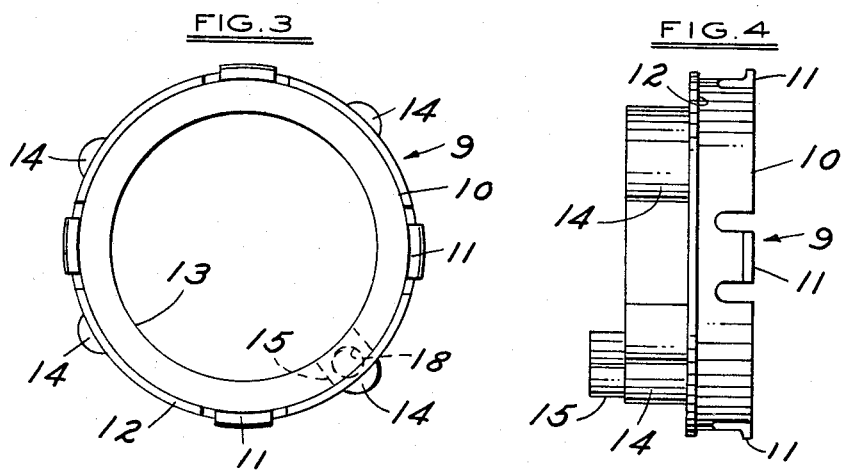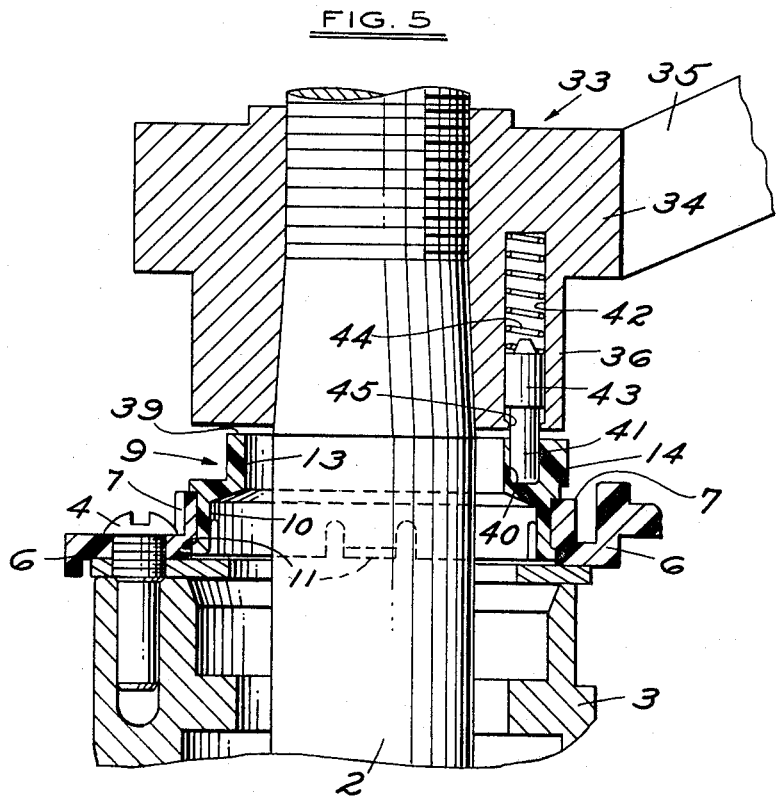

United States Patent Office 3,413,426
Patented Nov. 26, 1968

3,413,426
DIRECTION SIGNALING APPARATUS
Gerald McClure, Warren, and Ray F. Winogrocki, East Detroit, Mich., assignors, by mesne assignments, to Essex Wire Corporation, Fort Wayne, Ind., a corporation of Michigan
Filed June 17, 1966, Ser. No. 558,433
15 Claims. (Cl. 200—61)

ABSTRACT OF THE DISCLOSURE

Direction signaling apparatus for a vehicle having a rotatable steering member and a rotatable cam member operable to effect automatic canceling of the vehicle's direction signals, rotation of the cam member being caused by a driving pin interconnecting the steering member and the cam member. The driving pin is slideable in a bore formed in one of the members and is projected yieldably toward the other member in which there is a socket for reception of the driving pin.

---

This invention relates to vehicle direction signaling apparatus of the self-canceling kind and more particularly to canceling cam apparatus which is independent of but driven by a vehicle's steering mechanism so as to effect canceling of a direction signal in response to turning movements of the steering mechanism.

Self-canceling direction signaling apparatus in use heretofore has employed one or more cam members mounted on the steering shaft of a vehicle or on the steering wheel of the vehicle for rotation so as to be capable of engaging a return member mounted on a direction signaling actuator that is projected into the path of rotation of the cam when the direction signal is actuated. In such constructions, the direction signal actuator conventionally is mounted on a housing which surrounds the steering shaft and which may or may not be concentric with the shaft. If the shaft and housing are eccentric, such eccentricity quite often has made it impossible for the direction signal canceling mechanism to operate properly. To overcome this difficulty, it has been proposed to provide a direction signaling canceling member, or cam, mounted on and carried by the direction signal actuator itself so as to be independent of the steering shaft and the steering wheel of the vehicle. In this manner, true concentricity between the steering shaft and its surrounding housing is of no consequence inasmuch as the direction signal actuator may be mounted in such position as to assure proper cancelation of both the left-hand and right-hand direction signals. It is necessary in such constructions, however, to provide some means for effecting driving rotation of the canceling cam so as to avoid relative rotation between the canceling cam and the steering mechanism of the vehicle.

An object of this invention is to provide canceling apparatus for a vehicle direction indicator in which the canceling apparatus is independent of the vehicle's steering mechanism, is driven by the vehicle's steering mechanism, and is capable of being automatically fitted into driving relationship with the steering mechanism.

Another object of the invention is to provide direction signal canceling apparatus of the character described and in which difficulties in aligning a vehicle's steering mechanism and the direction signal canceling apparatus are overcome.

A further object of this invention is to provide direction signal operating apparatus having self-contained cam canceling means capable of being automatically connected in driving relation with a vehicle's steering mechanism during and in response to the assembly of the latter.

Another object of the invention is to provide apparatus of the kind referred to and in which a driving connection between the canceling cam and the steering mechanism may be assured even though the connection may not be completed until some time after the assembly of the steering mechanism.

A further object of the invention is to provide apparatus as described and wherein the steering mechanism may be disassembled for repair or the like and reassembled without necessitating replacement of the cam driving means.

Other objects and advantages of the invention will be pointed out specifically or will become apparent from the following description when it is considered in conjunction with the appended claims and the accompanying drawings, in which:

FIGURE 1 is a sectional view taken on the line 1—1 of FIGURE 2 and illustrating direction signaling apparatus in its neutral position and further illustrating the relationship among the steering mechanism, the direction signaling actuator, and the direction signal canceling apparatus;

FIGURE 2 is a sectional view taken generally on the line 2—2 of FIGURE 1 and illustrating the manner in which the direction signal canceling apparatus is drivingly assembled with part of the vehicle's steering mechanism;

FIGURE 3 is a bottom plan view of a canceling cam constructed in accordance with the invention;

FIGURE 4 is a side elevational view of the cam shown in FIGURE 3; and

FIGURE 5 is a view similar to FIGURE 2, but illustrating another embodiment of the apparatus.

Apparatus constructed in accordance with the embodiment of the invention illustrated in FIGURES 1–4 is adapted for use in conjunction with a vehicle having a rotatable steering shaft 2 that extends through a tubular column 3 which carries at its upper end a cup-shaped housing (not shown). Mounted on the housing and on the column 3 by screws 4 or the like, two of which are shown in FIGURE 1, is a base or support member 5 for direction signaling apparatus and having a substantially flat, annular flange 6 which surrounds the steering shaft 2. The flange 6 is radially spaced from the shaft 2 and is provided at its radially inner edge with an upstanding annular flange 7 which also is radially spaced from the steering shaft 2. An annular groove 8 is formed in the flange 6 at its radially inner edge.

Rotatably mounted within the flange 7 is an annular cam member 9 having a depending skirt 10 provided with a plurality of radially outwardly extending flanges 11 which are rotatably accommodated in the groove 8. At the upper edge of the skirt 10 is a laterally extending, flat surface flange 12 which overlies the flange 7. The member 9 includes an integral, annular rim 13 on which is provided a plurality of integral, substantially radially extending cam lobes 14 of uniform size. Extending axially from one of the lobes 14 is a tubular housing 15. The construction and arrangement of the cam member 9 are such that it is carried by the mounting member 6 and is rotatable relatively thereto, but the reception of the flanges 11 in the groove 8 precludes inadvertent separating of the members 9 and 5.

In the embodiment of the invention shown in FIGURES 1–4, driving means designated generally by the reference character 16 is provided for effecting rotation of the cam member 9. The driving means 16 comprises a pin or plunger 17 reciprocably mounted in an axially extending slot or bore 18 formed in the housing 15, and having an enlarged portion 19 against which one end of a compression spring 20 seats. The other end of the spring 20 seats against the base of the bore 18 and constantly, but yieldably, urges the pin 17 to an axially projected position. Inwardly directed projections 21 at the mouth of the bore 18 cooperate with the enlargement 19 to limit the extent to which the pin 17 may be projected. The depth of the bore 18 and the axial length of the pin 17 are such that the latter may be substantially completely retracted into the bore 18.

The base or support member 5 preferably includes an integral switch casing 22 formed of insulating material and in which is mounted a plurality of fixed contacts (not shown) which may be connected to their respective direction signaling lamps or other indicators. Through the casing 22 rotatably extends a shaft 23 having a generally rectangular upper end portion 24. Mounted on the shaft portion 24 for rotation therewith relatively to the casing 22 is an actuator member 25 having an arcuate body 26. Conductors 27 and 28 extend through the body and are joined to switch contacts (not shown) carried by the actuator for engagement and disengagement with selected fixed contacts carried by the casing 22. The conductors 27 and 28 respectively may be connected to a source of electrical energy, such as a battery, and in circuit with a brake-actuated switch for energizing a vehicle's stop lamps, as will be understood.

The body 26 of the actuating member 25 is provided at each end with an integral, flexible latching finger 30, each of which is adapted to be moved into latching engagement with a fixed latch abutment 31 mounted on the base member 5. Also carried at each end of the body 26 is a flexible release finger 32, either one of which is adapted to be moved from the position shown in FIGURE 1 into the path of rotation of the cams 14 and 15. For example, upon rocking of the shaft 23 clockwise from the position shown in FIGURE 1 by means of an operating handle (not shown) joined to the shaft 23, the body 26 also will be rocked clockwise so as to effect latching engagement between the left-hand latch parts 30 and 31. Such movement of the body will project the left-hand finger 32 into the path of rotation of the cam lobes 14. Rotation of the cam member 9 clockwise, as viewed in FIGURE 1, will effect engagement of the cams 14 with the projected return finger 32 so as to move the latter in a direction away from the associated latch finger 30. Counterclockwise rotation of the cam member 9 will effect engagement between the projected finger 32 and one of the cams 14 so as to move the finger 32 into engagement with the latch finger 30. Engagement between the fingers 32 and 30 will effect unlatching of the parts 30 and 31, whereupon a spring (not shown) reacting between the members 22 and 26 will restore the actuating member 25 to the neutral position shown in FIGURE 1.

The construction and operation of the direction signal actuator and related parts has been disclosed briefly for the purpose of clarifying the function and operating characteristics of the canceling cam apparatus 9. For a more detailed disclosure of the construction and operation of one direction signal operating apparatus similar to that shown herein and suitable for use with the canceling apparatus herein disclosed, reference may be had to United States Patent No. 3,239,619, granted Mar. 8, 1966.

In the disclosed embodiments of the apparatus, the steering shaft 2 has fixed adjacent its upper end a steering wheel 33 provided with a hub 34 from which a plurality of spokes 35 radiate. The hub 34 is provided with an annular portion 36 having a smooth, substantially flat surface 37 in which is formed an axially extending slot or bore 38 of such size and so oriented as to accommodate the driving pin 17. If desired, the hub surface 37 may have therein a groove 37a similar to a phonograph record groove and which communicates with the bore 38.

In the assembly of the apparatus thus far described, the parts of the direction signaling apparatus may be preassembled with the support member 5 and then assembled with the steering column 3 by slipping the annular flange 6 over the steering shaft 2 prior to assembly of the steering wheel 33 and the steering shaft. The screws 4 then may secure the member 5 to the steering column in a position in which the cam member 9 and the shaft 2 are substantially coaxial. This may be assured by making the openings in the flange 6 through which the screws 4 extend large enough to permit proper adjustment of the member 5. In these positions of the parts, the cam member 9 will surround the steering shaft 2, but will not engage the latter and the driving pin 17 will be in its projected position substantially parallel to the shaft 2. Thereafter, the steering wheel 33 may be assembled with the shaft 2 and be fixed to the latter so as to effect rotation of the shaft.

In the assembly of the steering wheel with the steering shaft, it is not necessary to align the bore 38 with the driving pin 17. If the pin and bore are not aligned, the surface 37 of the steering wheel hub will engage the pin 17 and effect retraction of the latter into its bore 18. Subsequent rotation of the steering wheel in one direction or the other will result in alignment of the bore 38 with the pin 17, whereupon the spring 20 will project the pin 17 into the bore 38, thereby interconnecting the steering wheel and the cam member 9. The groove 37a, if provided, will accommodate the pin 17 and guide the latter into the bore 38. Upon projection of the pin 17 into the bore 38, subsequent rotation of the steering wheel 33 will be accompanied by conjoint rotation of the cam member 9, thereby enabling the actuating member 25 to be restored from an operating position to its neutral position and effect cancellation of either a left-hand or right-hand direction indicating signal.

The embodiment of the invention shown in FIGURE 5 is similar to that previously described, but differs from the latter in that the tubular extension 15 is eliminated from the cam member 9 so as to provide a smooth, annular upper surface 39 for the flange 13. One of the cams 14 is provided with an axial slot or bore 40 therein of such size as to receive a pin 41 that is reciprocably mounted in a bore 42 formed in the skirt 36 of the hub 34 of the steering wheel 33. The pin 41 has an enlargement 43 against which one end of a compression spring 44 seats, the opposite end of which seats against the base of the bore 42. Radially inwardly extending projections 45 at the mouth of the bore 42 cooperate with the enlargement 43 to limit the extent of the projection of the pin 41.

The assembly of the apparatus shown in FIGURE 5 is the same as that described earlier, but in the event the pin 41 and the bore 40 are not initially aligned, the pin 41 will engage the surface 39 of the cam 9 and hold the pin 41 in its retracted position until such time as the steering wheel has been rotated to a position in which the pin may enter the bore 40, whereupon the steering wheel and the cam ring 9 will be interconnected and conjointly rotatable.

The disclosed embodiments are representative of presently preferred forms of the invention, but are intended to be illustrative rather than definitive thereof. The invention is defined in the claims.

What is claimed is:

1. Direction signal apparatus for a vehicle having a rotatable steering member, said apparatus comprising a cam member; means mounting said cam member for rotation in a path; direction signal actuating means; means mounting said actuating means adjacent said cam member; means on said actuating means mounted for movement into the path of said cam member for engagement therewith; driving means slideably mounted on one of said members and interconnecting said cam member and said steering member; and yieldable means acting between said one of said members and said driving means and yieldably urging the latter to move in a direction toward the other of said members.

2. The apparatus set forth in claim 1 including limit means acting between said one of said members and said driving means for limiting the extent of movement of said driving means toward the other of said members.

3. The apparatus set forth in claim 1 wherein said driving means is mounted on said cam member and is accommodated in a slot in said steering member.

4. The apparatus set forth in claim 3 wherein said steering member has a groove therein in communication with said slot.

5. The apparatus set forth in claim 1 wherein said driving means is mounted on said steering member and is accommodated in a slot in said cam member.

6. Vehicle direction signal apparatus comprising support means; actuating means mounted on said support means for movement from a neutral position to an operating position; cam means mounted on said support means for rotation in a path; return means carried by said actuating means and movable into the path of said cam means in response to movement of said actuating means from said neutral position to said operating position; driving means mounted on said cam means for movements between retracted and projected positions and operable to rotate said cam means; and yieldable means acting between said cam means and said driving means and constantly but yieldably urging the latter toward said projected position.

7. The apparatus set forth in claim 6 including limit means acting between said cam means and said driving means for limiting movement of the latter beyond said projected position.

8. The apparatus set foth in claim 6 wherein said driving means is movable axially of the rotation of said cam means.

9. In a vehicle steering assembly having a rotatable steering member, direction signal actuating means mounted adjacent said steering member for movements between neutral and operating positions, and a cam member independent of said steering means mounted adjacent said actuating means for rotation: driving means; means mounting said driving means on one of said members and adjacent the other of said members for movement in a direction toward and into driving engagement with the other of said members; and yieldable means acting on said driving means and yieldably urging the latter to move in said direction.

10. The construction set forth in claim 9 wherein said driving means is mounted on said cam member.

11. The construction set forth in claim 10 wherein said steering member has a slot therein for the accommodation of said driving means.

12. The construction set forth in claim 11 wherein said steering member comprises a steering wheel having an annular hub in which said slot is formed.

13. The construction set forth in claim 12 wherein said annular hub has a groove therein in communication with said slot.

14. The construction set forth in claim 9 wherein said driving means is mounted on said steering member.

15. The construction set forth in claim 14 wherein said cam member has a slot therein for the accommodation of said driving means.

References Cited

UNITED STATES PATENTS

| | | | |
|---|---|---|---|
| 2,343,355 | 3/1944 | Yanchenko et al. | 200—59 |
| 2,999,911 | 9/1961 | Dryer et al. | 200—61.34 |
| 3,209,092 | 9/1965 | Vitaloni et al. | 200—61.34 |

BERNARD A. GILHEANY, *Primary Examiner.*

F. E. BELL, *Assistant Examiner.*